United States Patent [19]

Wilhelm

[11] 4,449,194

[45] May 15, 1984

[54] MULTIPLE POINT, DISCRETE COSINE PROCESSOR

[75] Inventor: Randy L. Wilhelm, Mesa, Ariz.

[73] Assignee: Motorola Inc., Schaumburg, Ill.

[21] Appl. No.: 305,584

[22] Filed: Sep. 25, 1981

[51] Int. Cl.³ .................... G06F 15/332; G06F 7/52
[52] U.S. Cl. ................................... 364/725; 364/757
[58] Field of Search .................. 364/725, 726, 757; 358/141

[56] References Cited

U.S. PATENT DOCUMENTS

| | | | |
|---|---|---|---|
| 3,696,235 | 10/1972 | Tufts et al. | 364/724 |
| 4,034,198 | 7/1977 | Kindell | 364/757 |
| 4,080,661 | 3/1978 | Niwa | 364/726 |
| 4,104,729 | 8/1978 | Gingell | 364/757 |
| 4,152,772 | 5/1979 | Speiser et al. | 364/725 |
| 4,196,448 | 4/1980 | Whitehouse et al. | 364/725 X |

OTHER PUBLICATIONS

Ahmed et al., "Discrete Cosine Transform" *IEEE Trans. on Computers* Jan. 1974, pp. 90–93.

Primary Examiner—David H. Malzahn
Attorney, Agent, or Firm—Eugene A. Parsons

[57] ABSTRACT

A discrete cosine processor for video signals and the like wherein each term of a discrete cosine transform matrix is approximated by a power of 2 terms so that all mathematical steps are performed by shifting and/or subtracting digital data. The apparatus includes fully pipelined shifting circuits, circulating memories and a fully pipelines accumulator to provide the transformed terms.

11 Claims, 5 Drawing Figures

MULTIPLE POINT, DISCRETE COSINE PROCESSOR

BACKGROUND OF THE INVENTION

In the transmission of signals which are normally broadband, such as video and the like, it is sometimes desireable and expedient to reduce the bandwidth even though some definition of the data being transmitted is lost. Reducing the bandwidth, generally referred to as bandwidth compression, is performed by first transforming the data into a different domain, quantizing the transformed data and selecting terms with the highest energy. Generally, higher order terms contain less information and energy and lower order terms contain more information and energy. At the receiver the reverse operation is performed to transform the data back into the wideband, e.g., video.

The discrete cosine transform is similar to the discrete Fourier transform and has become an extremely popular transform for bandwidth compression techniques. It has been shown to be very close to the Karhunen-Loeve transform, which is optimal in producing uncorrelated coefficients. Bandwidth compression techniques where a two dimensional transformation is used usually require only an 8 or 16 point transform. To perform this transform previous techniques used were based on a fast Fourier transform approach. However, for 8 point transforms the fast Fourier transform approach doesn't offer any real advantage over the direct matrix computation and requires increased control circuitry. Previous direct matrix computations required extensive multiplication, requiring relatively complicated apparatus and extensive time.

SUMMARY OF THE INVENTION

The processor described herein utilizes an approximation of a discrete cosine transform matrix wherein each term has been converted to a power of 2 so that data is simply shifted and subtracted to provide the necessary computations. Further, the apparatus incorporates a fully pipeline approach with circulating memories to implement the transform, resulting in an efficient high-speed processor requiring very little overhead control circuitry.

It is an object of the present invention to provide an improved multiple point, discrete cosine processor.

It is a further object of the present invention to provide a discrete cosine processor incorporating an approximate discrete cosine transform matrix wherein each term is defined by a power of 2 term.

It is a further object of the present invention to provide an improved discrete cosine processor incorporating a fully pipeline approach with circulating memories to substantially reduce the amount of equipment required and the time of processing.

These and other objects of this invention will become apparent to those skilled in the art upon consideration of the accompanying specification, claims, and drawings.

BRIEF DESCRIPTION OF THE DRAWINGS

Referring to the drawings.

DESCRIPTION OF THE PREFERRED EMBODIMENT

Figure 1:
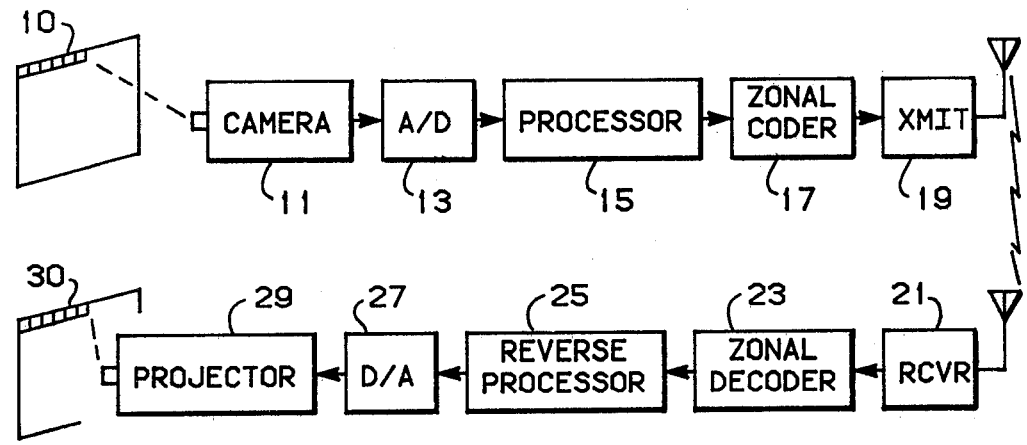
FIG. 1 is a simplified block diagram of a system incorporating a discrete cosine processor.

Referring specifically to FIG. 1, the number 10 designates a picture, scene, paper, etc. which it is desired to transmit to a remote location. A video camera 11, which is similar to a television camera or the like, scans the picture 10 in a plurality of horizontal scans and thereby converts the visual perception into a continuous analog serial electrical signal. The analog electrical signal from the camera 11 is converted to a digital signal by an analog to digital converter 13. Thus, the picture 10 is converted to electrical signals representative of a plurality of discrete points (possibly several hundred) per horizontal line and a plurality of horizontal lines (possibly in the hundreds) per picture 10. It will of course be understood that the conversion of visual perception into electrical signals is well known to those skilled in the art and that a variety of different methods of scanning the picture may be devised, including the scanning of small sections, etc.

The digital signals, each in the form of a word representative of a discrete point in the picture 10, are supplied to a processor 15 which transforms the digital signals into a different domain for further operations. In prior art structures the processors utilized, for example, fast Fourier transforms. In the present invention discrete cosine transforms are utilized for purposes which will become apparent presently.

Once the digital signals are properly transformed, the output data is quantized in a zonal coder 17 and selected terms are supplied to a transmitter 19 for transmission to a remote receiver 21. Quantizers are well known in the art and will not be described in detail herein. Generally, the quantizer converts the transformed data to discrete steps which may be defined, or described, by digital words having fewer bits. Generally, the terms selected are those having the most energy and these terms may be selected by any of a variety of methods. One example might be, for example, to utilize a threshold and only select data which exceeds the threshold. A second method might be to select predetermined terms which contain the most information, as for example, lower order terms (thereby dropping the higher order terms containing less information) by dropping terms containing less information and by quantizing the data, the amount of data being transmitted is substantially reduced and, therefore, the bandwidth is substantially reduced.

The data received by receiver 21 is then passed through a decoder 23 and a reverse processor 25 to convert the data back into substantially the original form. The reassembled data from the reverse processor 25 is then converted to an analog form by a D to A converter 27 and supplied to a projector 29 which reassembles the electrical signals into a picture 30 similar in detail to picture 10. While the system generally is well known in the art and does not require further explanation, except for the processor 15, it will be understood by those skilled in the art that various modifications are required to accommodate the improved processor, such as the specific selected terms in the zonal coder 17.

These modifications will be described as they arise in conjunction with the specific description of the processor 15.

The Discrete Cosine Transform (DCT) of 1×M sampled data points X(m), m32 0 - - - (M−1) is defined as:

$$G_X(0) = \frac{\sqrt{2}}{M} \sum_{m=0}^{M-1} X(m) \quad (dc \text{ coefficient})$$

$$G_X(K) = \frac{2}{M} \sum_{m=0}^{M-1} X(m) \cos \frac{(2m-1)K\pi}{2M} \quad K = 1, 2, \ldots (M-1)$$

where $G_X(K)$ is the $K^{th}$ DCT coefficient.

In order to transform 1×M points using the DCT requires M×(M−1) additions and multiplications. For an 8 point transform 56 additions and multiplications are required. Chart 1 is the DCT matrix for an 8×8 data block (the scale factor $\sqrt{2}$/m and 2/M have been removed and can be included in the zonal coder 17 function). The one-dimensional transform can then be represented as:

T=CP where:
C=Cosine Transform Matrix
P=8×8 data block
T=8×8 transformed data

It has been determined that the cosine term can be represented with 3 bits of resolution and still maintain the necessary accuracy for an 8 point DCT. Chart 2 is the DCT matrix where powers of 2 are used in representing coefficients wherever possible. Multiplication by powers of 2 can be implemented by shifting the sampled data. Data shifting devices are well known in the art and will not be described in detail herein. The remaining operations require 56 additions and the generation of $p_n \cdot 7[P_n \cdot (2^3-1)]$ and $P_n \cdot 3[P_n \cdot (2^2-1)]$. The multiplication by 7 and 3 requires only one addition (subtraction) apiece. Since each data point must be premultiplied by 3 and 7 a total of 56 additions plus 2 additional adds per point are needed. In order to simplify the accumulation process, the premultiplies will be done in parallel prior to actual accumulation.

CHART 1
Discrete Cosine Transform Matrix $$\alpha = \frac{\pi}{16} = 11.25°$$

$$[C] = \begin{bmatrix}
1 & 1 & 1 & 1 & 1 & 1 & 1 & 1 \\
\cos\alpha & \cos 3\alpha & \cos 5\alpha & \cos 7\alpha & -\cos 7\alpha & -\cos 5\alpha & -\cos 3\alpha & -\cos\alpha \\
\cos 2\alpha & \cos 6\alpha & -\cos 6\alpha & -\cos 2\alpha & -\cos 2\alpha & -\cos 6\alpha & \cos 6\alpha & \cos 2\alpha \\
\cos 3\alpha & -\cos 7\alpha & -\cos\alpha & -\cos 5\alpha & \cos 5\alpha & \cos\alpha & \cos 7\alpha & -\cos 3\alpha \\
\cos 4\alpha & -\cos 4\alpha & -\cos 4\alpha & \cos 4\alpha & \cos 4\alpha & -\cos 4\alpha & -\cos 4\alpha & \cos 4\alpha \\
\cos 5\alpha & -\cos\alpha & \cos 7\alpha & \cos 3\alpha & -\cos 3\alpha & -\cos 7\alpha & \cos\alpha & -\cos 5\alpha \\
\cos 6\alpha & -\cos 2\alpha & \cos 2\alpha & -\cos 6\alpha & -\cos 6\alpha & \cos 2\alpha & -\cos 2\alpha & \cos 6\alpha \\
\cos 7\alpha & -\cos 5\alpha & \cos 3\alpha & -\cos\alpha & \cos\alpha & -\cos 3\alpha & \cos 5\alpha & -\cos 7\alpha
\end{bmatrix}$$

CHART 2
Cosine Matrix $$|C||P| = |T| = \begin{bmatrix} T_0 \\ T_1 \\ T_2 \\ T_3 \end{bmatrix} = \frac{1}{8} \begin{bmatrix}
2^3 & 2^3 & 2^3 & 2^3 & 2^3 & 2^3 & 2^3 & 2^3 \\
2^3 & (2^3-1) & 2^2 & 2 & -2 & -2^2 & -(2^3-1) & -2^3 \\
(2^3-1) & (2^2-1) & -(2^2-1) & -(2^3-1) & -(2^3-1) & -(2^2-1) & (2^2-1) & (2^3-1) \\
(2^3-1) & -2 & -2^3 & -2^2 & 2^2 & 2^3 & 2 & -(2^3-1)
\end{bmatrix} \begin{bmatrix} P_0 \\ P_1 \\ P_2 \\ P_3 \end{bmatrix}$$

$$\begin{bmatrix} T_4 \\ T_5 \\ T_6 \\ T_7 \end{bmatrix} \quad \begin{bmatrix}
(2^3-2) & -(2^3-2) & -(2^3-2) & (2^3-2) & (2^3-2) & -(2^3-2) & -(2^3-2) & (2^3-2) \\
2^2 & -2^3 & 2 & (2^3-1) & -(2^3-1) & 2 & -2^3 & 2^2 \\
2^2-1 & -(2^3-1) & (2^3-1) & -(2^2-1) & -(2^2-1) & (2^3-1) & -(2^3-1) & (2^2-1) \\
2 & -2^2 & (2^3-1) & -2^3 & 2^3 & -(2^3-1) & 2^2 & -2
\end{bmatrix} \begin{bmatrix} P_4 \\ P_5 \\ P_6 \\ P_7 \end{bmatrix}$$

Figure 2:
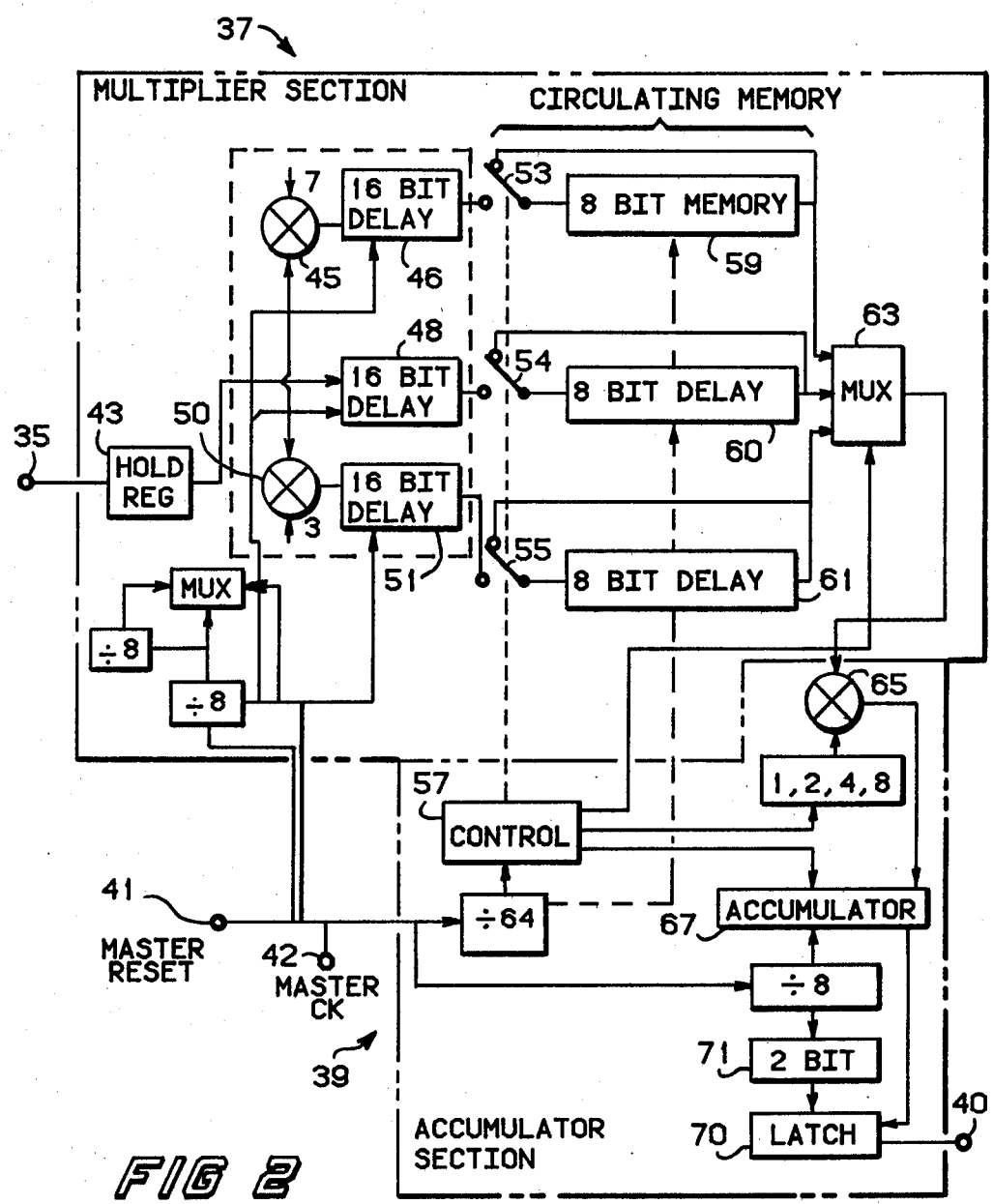
FIG. 2 is a more detailed block diagram of a discrete cosine processor incorporating the present invention.

FIG. 2 is a simplified block diagram/flow chart of the 8 point discrete cosine transform processor 15. In this embodiment, each digital word from the converter 13, composed of 12 or less bits, is applied to an input terminal 35 of the processor 15. The processor 15 is broken up into two portions (broken lines) a premultiplier section 37 having the input terminal 35 connected thereto and an accumulator section 39 having an output terminal 40 which supplies the transformed data to the zonal coder 17. A pair of terminals 41 and 42 are adapted to have master reset and master clock signals applied thereto, respectively, for the timing and operation of the processor 15. The apparatus of FIG. 2 is shown partially in terms of the ultimate function provided rather than actual apparatus but the apparatus which is or can be utilized will be understood once the functions are described in detail.

Input terminal 35 is connected to an 8 word input hold register 43 which may be, for example, a first-in first-out register or the like. The data in the register 43 is supplied through a multiply by 7 device 45 to a 16 bit delay 46, to a second 16 bit delay 48, and through a multiply by 3 device 50 to a third 16 bit delay 51. The two multipliers 45 and 50 and the 3 delays 46, 48 and 51 form a premultiplier array which will be described in detail in conjunction with FIG. 3. The outputs of the 3 delays 46, 48 and 51 are supplied through functional switches 53, 54 and 55 (all of which are operated by a control 57) to 3 circulating memories 59, 60 and 61, respectively. The outputs of the circulating memories 59, 60 and 61 are connected to a multiplexing circuit 63 which is also controlled by the control 57. The output of the multiplexing circuit 63 is the output of the premultiplier section 37 and is connected to a multiplier 65 in the accumulator section 39. The multiplier 65 multiplies the output of the multiplexer 63 by a term 1, 2, 4, or 8 (shift operations) selected by the control 57. The output of the multiplier 65 is then connected to an accumulator 67, which is a special 18 bit delay pipeline accumulator illustrated in more detail in FIG. 5. The output of the accumulator 67 is supplied to an output latch circuit 70 which supplies the data at the proper time to the terminal 40. The master reset and the master clock supplied to the terminals 41 and 42 are supplied through various divide circuits to the components described to provide the correct timing required.

Input data at the terminal 35 is stored in hold register 43 at ⅛ the processor clock rate. As soon as the first 8 data points (8 words) have been stored in the hold register 43, the data is output to the premultiplier array at the processor clock rate. The output data is then premultiplied by 7 and 3. Multiplying the data by 7 consists of multiplying times the term $(2^3-1)$ which simply consists of shifting the data three places to the left and subtracting the original data from the shifted data. Multiplying the data by 3 consists of multiplying by the term $(2^2-1)$ which simply consists of shifting the data 2 places to the left and subtracting the original data from the shifted data. These functions are performed in the premultiplier array and are illustrated as a multiply and a delay. The initial delay through the premultiplier array is 16 clock cycles, after the initial delay a new premultiplied data point will be generated every period of the processor clock. The data supplied to the circulating memories 59, 60 and 61 is $P_n \cdot 7$, $P_n$ and $P_n \cdot 3$, respectively. The circulating memories 59, 60 and 61 are switched by the control 57 so that the same data can be read every 8 clock cycles. The output of the three circulating memories 59, 60 and 61 is then multiplexed by the multiplexing circuit 63 during each clock cycle and the output is multiplied by 1, 2, 4 or 8 in the multiplier 65, depending on the cosine coefficient being generated. After the circulating memories 59, 60 and 61 have been completely rotated 7 times, a new set of premultiplied data points are shifted in and the last group is shifted out. The control 57 is preprogrammed so that the multiplexer 63 selectes the correct output from the circulating memories 59, 60 or 61 and selects the correct number of left shifts (0, 1, 2, or 3) to provide the correct multiplication and to produce all of the terms of the cosine matrix of chart 2 in the correct order.

The premultiplied data from the multiplier 65 is shifted into the accumulator 67. The accumulator 67 requires an initial 18 bit delay, plus 8 more clock periods to accumulate. This is an expansion of the accumulator illustrated in FIG. 5. After the first coefficient is output a new coefficient is generated every 8 clock pulses. In addition to selecting the correct output from the circulating memory and the correct multiplication factor in the multiplier 65, the control circuit 57 is programmed to perform, at preselected times, a 2's complement on the incoming data to the accumulator 67. In addition to the control circuitry 57, various counters are used to create MODULO 8 timing pulses. One example is a clock 71 to the output latch 70. Since a new coefficient is generated every 8 clock pulses, the data is latched in the latch 70 so it can be held for 8 processor clock periods. The clock to the output latch 70 is delayed by two bits since the accumulator 67 has an initial two bit delay (modulo 8). The effective output data will equal the input data rate and be ⅛ the processor clock frequency. The division by 8 required to properly average the data (see Chart 2) is accomplished in the accumulator 67 by simply shifting the accumulated data 3 places to the right.

Figure 4:
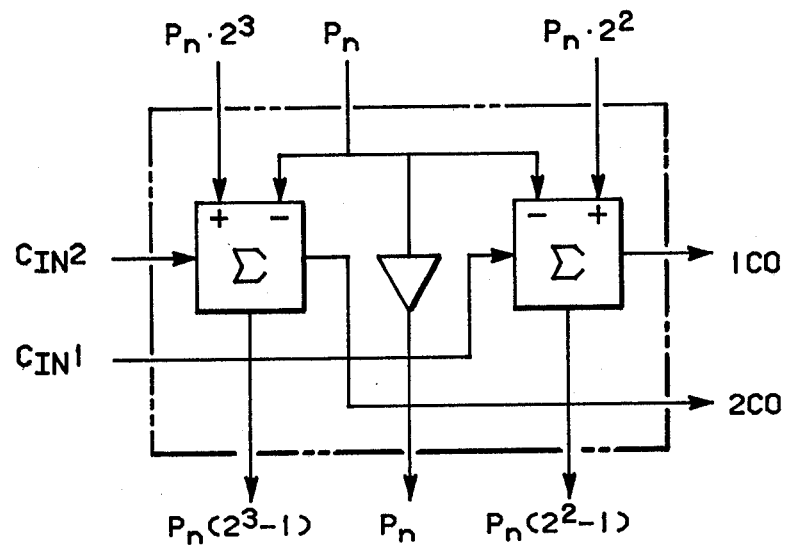
FIG. 4 is a more detailed block diagram of a portion of the block diagram illustrated in FIG. 3.
Figure 3:
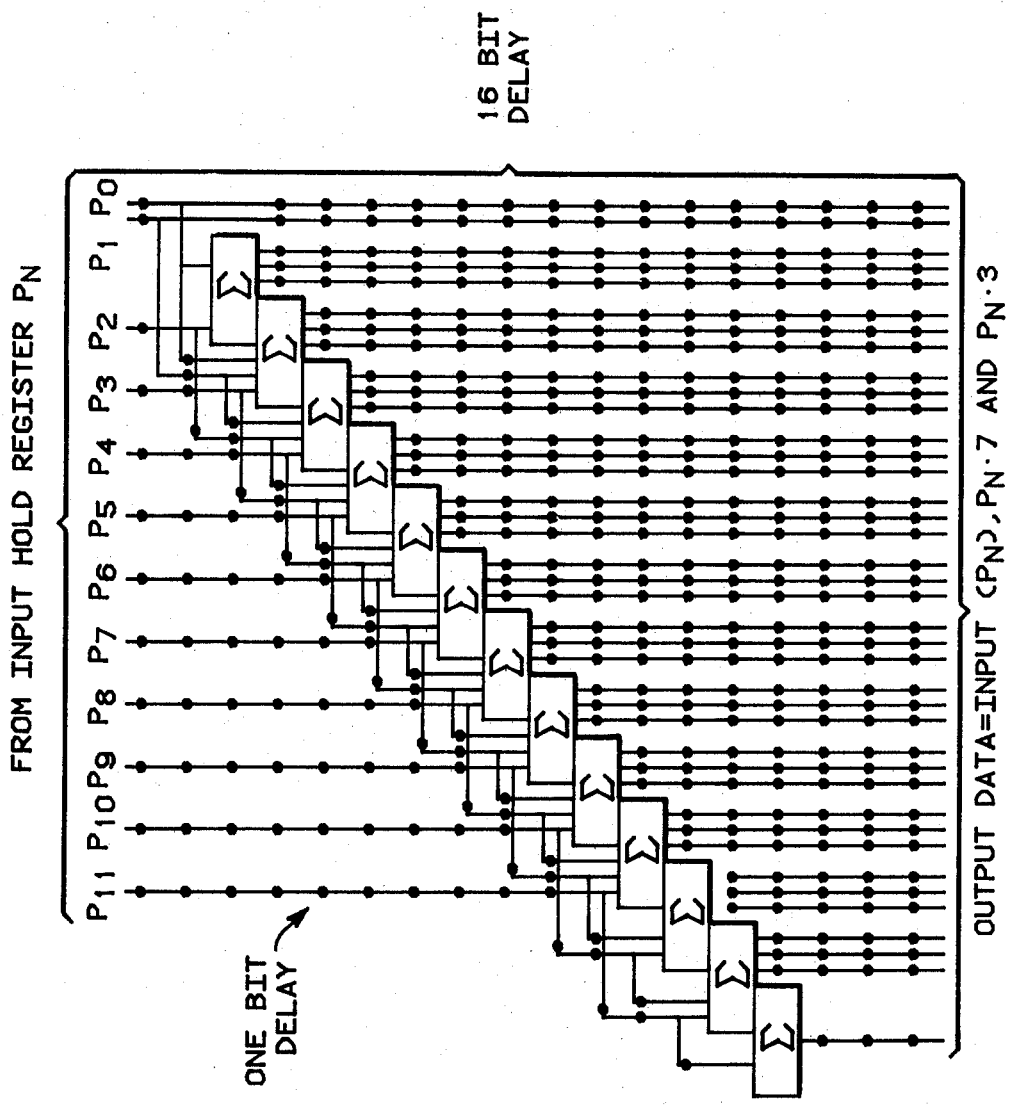
FIG. 3 is a block diagram/flow chart of the premultiplier portion of FIG. 2.

The premultiplier array (multipliers 45 and 50 and delays 46, 48 and 51) is illustrated in more detail in FIG. 3. The premultiplier array is composed of 13 summation cells each of which is similar and illustrated in detail by the cell in FIG. 4. The 12 input leads $P_0$ through $P_{11}$ represent the lines carrying the 12 bits for each word. The shifts required to provide the multiplications, $P_N$ times $2^3$ and $P_N$ times $2^2$, are accounted for by the connections of the input leads to the summation cells. Each summation cell has three one bit inputs and provides three one bit outputs representative of $P_N$, $P_N \cdot 2^3$ minus $P_N$ and $P_N \cdot 2^2$ minus $P_N$. Thus, one lead from each of the summation cells having data representative of $P_N$ thereon is connected to the circulating memory by the switching function 54 and one lead from each of the summation cells representative of the data $P_N \cdot 2^2$ minus $P_N$ is connected to the circulating memory 61 by the switching function 55 and the remaining lead of each of the summation cells is connected to the circulating memory 59 by the switching function 53. The actual adders of the summation cell, complete with the carries, operate in a manner well known to those skilled in the art and will not be elaborated upon further herein. The entire premultiplier array is fully pipelined so that the least significant bit ($P_0$) of a 12th word is entering the first summation cell as the most significant bit ($P_{11}$) of the first word is being clocked out of the premultiplier array. The actual delays and connections of the summation cells for the premultiplier array are the same as the connections of FIG. 5 and will be described in conjunction therewith.

The multiplexer 63 operates on a preselected program supplied by the control circuit 57 and connects the selected output word ($P_N$, $P_N \cdot 7$, or $P_N \cdot 3$) to the multiplier 65. The multiplier 65 shifts the multiple bit digital word supplied in parallel thereto by any one of 0, 1, 2, or 3 places to the left which is equal to a multiplication of 1, 2, 4, or 8 respectively. The multiplier 65 may be any device which will accomplish this selective shifting, such as any of the commercially available IC packages, (e.g., AM 25S10). The multiplier 65 may also be a simple multiplexing circuit wherein the various outputs of the multiplexing circuit 63 are connected so that the bits are shifted as required. The control circuit 57 is programmed so that the output of the multiplier 65 appears in the order specified by the multiplication illustrated in Chart 2. $P_0$ through $P_7$ of chart 2 represent the eight 12 bit words stored in the hold register 43. The order of the data at the output of the multiplier 65 will be $P_0$ times the first term in the first horizontal row of the cosine matrix of Chart 2. The second output word will be $P_1$ times the second term in the first horizontal row of the cosine matrix. The third output word from the multiplier 65 will be $P_2$ times the third term in the first horizontal row of the cosine matrix, etc. The accumulator 67 then combines the first 8 terms from the multiplier 65 ($P_0$ through $P_7$ times the 8 terms in the first horizontal row of the cosine matrix) and divides the 8 terms by 8 to provide a single output term to the latch 70. The second output term from the accumulator 67 is a summation of $P_0$ through $P_7$ times the 8 terms in the second horizontal row of the cosine matrix divided by 8, etc.

Figure 5:
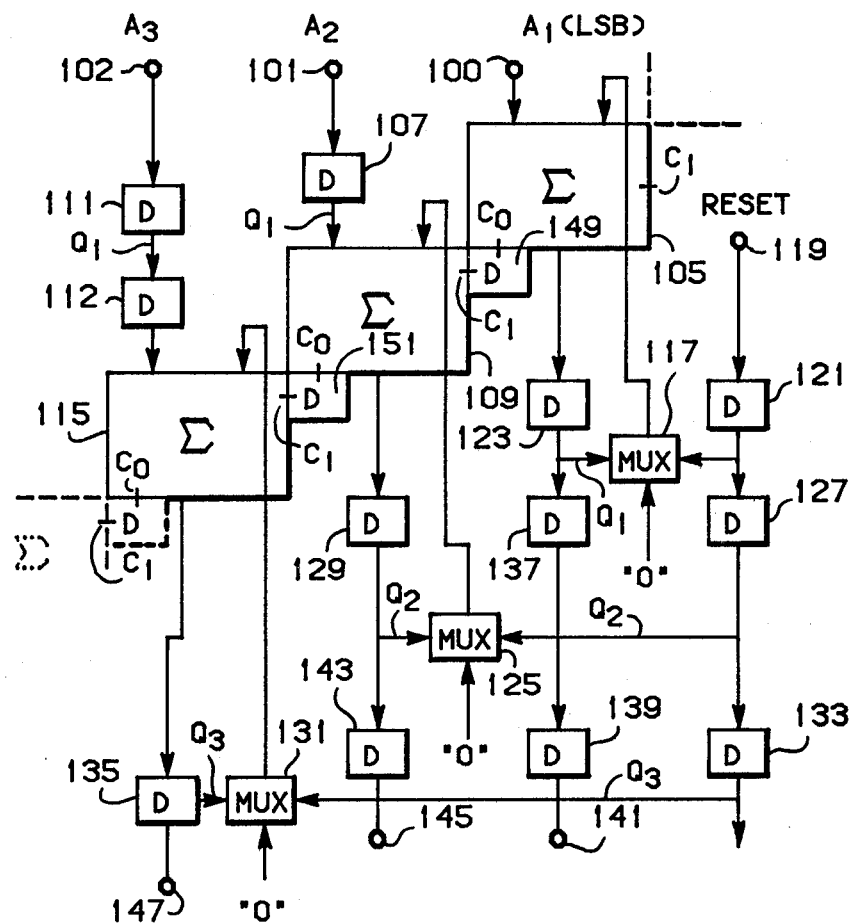
FIG. 5 is a more detailed block diagram of the accumulator portion of FIG. 2.

While the accumulator 67 may be any device which will accumulate the input words in accordance with the description set forth above, an example of an accumulator which will perform this function very efficiently is illustrated in FIG. 5. The accumulator of FIG. 5 is constructed to receive only three bits in parallel but it will be clear to those skilled in the art that this accumulator can be extended in accordance with the teachings herein to a 12 bit accumulator or even more if desired.

Referring specifically to FIG. 5, the 3 bit parallel input to the accumulator is designated 100, 101, and 102, respectively, with the terminal 100 receiving the least significant bit. Terminal 100 is connected directly to one input of a 2 bit summation cell 105. Terminal 102 is connected through one 1 bit delay 107 to a first input of a second summation cell 109. Terminal 102 is connected through two 1 bit delays 111 and 112 to a first input of a third summation cell 115. A second input of the summation cell 105 is connected to a multiplexing circuit 117 having three inputs. A terminal 119, adapted to have a reset signal applied thereto, is connected through a one bit delay 121 to one input of the multiplexing circuit 117. A second input of the circuit 117 has a constant 0 applied thereto and a third input of the circuit 117 is connected through a one bit delay 123 to the output of the summation cell 105. A second input of the summation cell 109 is connected to the output of a second multiplexing circuit 125 having three inputs. A first input of the circuit 125 is connected through a one bit delay 127 to the output of the one bit delay 121. A second input of the circuit 125 is connected to a constant 0. A third input of the circuit 125 is connected through a one bit delay 129 to the output of the summation cell 109. A second input of the summation cell 115 is connected to an output of a third multiplexing circuit 131 having three inputs. A first input of the circuit 131 is connected through a one bit delay 133 to the output of the one bit delay 127. A second input to the circuit 131 is a constant 0. A third input to the circuit 131 is connected through a one bit delay 135 to the output of the summation cell 115. The output of the one bit delay 123 is connected through two one bit delays 137 and 139 to a first output terminal 141, which provides the least significant bit of a three bit output word. The output of the one bit delay 129 is connected through a one bit delay 143 to a second output terminal 145. The output of the one bit delay 135 is connected directly to a third output terminal 147. Carries between the summation cells 105 and 109 are supplied through a one bit delay 149 and carries between the summation cells 109 and 115 are supplied through a one bit delay 151.

For convenience in illustrating the operation of the three bit accumulator illustrated in FIG. 5, Chart number 3 is included herewith. The three bits of the first word applied to the accumulator are designated A1, A2 and A3. The three bits of the second word are designated B1, B2 and B3, etc. In Chart 3 the final summation ($Q_3$ of i plus 5) represents the first three bit output word available at the output terminals 141, 145 and 147. Thus, it will quickly be seen by those skilled in the art that the 3 bit accumulator illustrated in FIG. 5 can be easily extended to accommodate any desired multiple bit input words. Further, the accumulator is fully pipelined to substantially reduce the amount of time required for the accumulation. When the accumulator is utilized as the accumulator 67 in the processor of FIG. 2, a divide by 8 is required at the output thereof. This divide by 8 can be accomplished by means of a shift register or the like, (as described in detail above) which shifts the output multiple bit word by 3 places to the right to produce the divide function. It will of course be understood by those skilled in the art, in view of the teachings above, that this shift function can be incorporated into the connection between the accumulator 67 and the latch 70, if desired.

Thus, an improved multiple point, discrete cosine processor for digital signals is disclosed which substantially simplifies the construction of the processor and reduces the amount of components required. Further, because of the fully pipelined components and the reduction in operations the speed of the processor is substantially enhanced. In addition to the above advantages the required control logic is substantially reduced and the efficient architecture leads to a lower power requirement.

While I have shown and described a specific embodiment of this invention, further modifications and improvement will occur to those skilled in the art. I desire it to be understood, therefore, that this invention is not limited to the particular form shown and I intend in the appended claims to cover all modifications which do not depart from the spirit and scope of this invention.

CHART 3

| CLOCK | i | | | i + 1 | | | i + 2 | | |
|---|---|---|---|---|---|---|---|---|---|
| INPUT | $A_3$ | $A_2$ | $A_1$ | $B_3$ | $B_2$ | $B_1$ | $C_3$ | $C_2$ | $C_1$ |
| $Q_1$ | X | X | X | $A_3$ | $A_2$ | $A_1$ | $B_3$ | $B_2$ | $A_1+B_1$ |
| $Q_2$ | X | X | X | X | X | X | $A_3$ | $A_2$ | $A_1$ |
| $Q_3$ | X | X | X | X | X | X | X | X | X |

| CLOCK | i + 3 | | | i + 4 | | | i + 5 | | |
|---|---|---|---|---|---|---|---|---|---|
| INPUT | $A'_3$ | $A'_2$ | $A'_1$ | $B'_3$ | $B'_2$ | $B'_1$ | $C'_3$ | $C'_2$ | $C'_1$ |
| $Q_1$ | $C_3$ | $C_2$ | $A_1+B_1+C_1$ | $A'_3$ | $A'_2$ | $A'_1$ | $B'_3$ | $B'_2$ | $A'_1+B'_1$ |
| $Q_2$ | $B_3$ | $A_2+B_2$ | $A_1+B_1$ | $C_3$ | $A_2+B_2+C_3$ | $A_1+B_1+C_1$ | $A'_3$ | $A'_2$ | $A'_1$ |
| $Q_3$ | $A_3$ | $A_2$ | $A_1$ | $A_3+B_3$ | $A_2+B_2$ | $A_1+B_1$ | $A_3+B_3+C_3$ | $A_2+B_2+C_2$ | $A_1+B_1+C_1$ |

We claim:

1. A multiple point, discrete cosine processor for digital signals comprising:
   (a) a premultiplier connected to receive the digital signals and to multiply each of the signals by a plurality of fixed, different factors, said premultiplier having an output for each of the different factors;
   (b) signal selection circuitry connected to the outputs of said premultiplier and having a single output, said selection circuitry supplying premultiplied signals from the outputs of said premultiplier to the output of said selection circuitry in a predetermined order;
   (c) a multiplier constructed to multiply each input signal by a selected one of a plurality of predetermined factors, said multiplier being connected to the output of said selection circuitry and providing the multiplied signals at an output;
   (d) control circuitry connected to said selection circuitry and said multiplier and controlling the predetermined order of the premultiplied signals from said selection circuitry and the selection of the multiplying factors in said multiplier so the multiplied signals at the output of said multiplier represents the multiple points multiplied by an approximation of a discrete cosine transform matrix; and (e) an accumulator connected to the output of said multiplier for combining the multiplied signals into transformed terms.

2. A processor as claimed in claim 1 wherein the plurality of fixed, different factors include 1, 3 and 7.

3. A processor as claimed in claim 1 wherein the plurality of predetermined factors include 1, 2, 4 and 8.

4. A processor as claimed in claim 1 wherein each factor in the discrete cosine transform matrix is approximated by a factor $(2^n \pm X)$, where n is any integer, 1, 2, 3 ... n and X is any of the integers 0, 1, 2, and the premultiplier and multiplier include a combination of shifting and subtracting circuits.

5. A processor as claimed in claim 1 wherein each digital signal is a multiple-bit word and the premultiplier is pipelined so that it is operating simultaneously on a number of words equal to the number of bits in each word.

6. A processor as claimed in claim 1 wherein each digital signal is a multiple-bit word and the accumulator is pipelined so that it is operating simultaneously on a number of words equal to the number of bits in each word.

7. A processor as claimed in claim 1 wherein the signal selection circuitry includes a plurality of circulating memories and a multiplexer connected thereto.

8. A processor as claimed in claim 1 wherein the accumulator includes a divider.

9. An eight point, discrete cosine processor for digital signals comprising:
   (a) a premultiplier connected to receive the digital signals and to provide products of the digital signals with the factors 1, 3 and 7, said premultiplier having an output for each of the different products;
   (b) signal selection circuitry connected to the outputs of said premultiplier and including a circulating memory for each output and a multiplexer connected between the memories and an output of said selection circuitry, said selection circuitry supplying premultiplied signals from the outputs of said premultiplier to the output of said selection circuitry in a predetermined order;
   (c) a multiplier constructed to provide a product for each input signal and a selected one of factors 1, 2, 4 and 8, said multiplier being connected to the output of said selection circuitry and providing the products at an output;
   (d) control circuitry conncted to said selection circuitry and said multiplier and controlling the predetermined order of the premultiplied signals from said selection circuitry and the selection of the multiplying factors in said multiplier so the products at the output of said multiplier represent the eight points multiplied by an approximation of a discrete cosine transform matrix; and
   (e) an accumulator, including a divider designed to divide by eight, connected to the output of said multiplier for combining the output of said multiplier for combining the output products thereof into tranformed terms.

10. A data processor for multiple bit digital signals having a multiple terminal input for receiving the multiple bits of a digital signal in parallel, said processor comprising:
   (a) first and second pluralities of summation cells each having first and second input and first and second outputs, each of the second outputs having carry signals thereon, each of said summation cells supplying a signal at the first output equal to the difference between signals supplied to the first and second inputs;
   (b) connecting means connecting said multiple terminal input to the second inputs of each of said first and second pluralities of summation cells, to the first input of each of said first plurality of summation cells so that the multiple bits are shifted three places to the left with respect to the connection to the second inputs of said first plurality of summation cells, and to the first input of each of said second plurality of summation cells so that the multiple bits are shifted two places to the left with respect to the connections to the second inputs of said second plurality of summation cells; and
   (c) shifting means connected to the first outputs of each of said first and second pluralities of summation cells, said shifting means selectively shifting the signal on the first outputs of one of said first and second pluralities of summation cells a selected one of 0, 1, 2 and 3 places.

11. A method of transmitting video information with a relatively narrow bandwidth comprising the steps of:
   (a) converting the video information to digital signals, each signal being a multiple bit word; $P_N$;
   (b) approximating each factor in a discrete cosine transform matrix with a factor $(2^n \pm X)$, where n is any of the integers 1, 2, 3 and X is any of the integers 0, 1, 2;
   (c) forming the digital signals into 8 point transforms including the products of the approximate matrix and 8 words by
      producing three products from each word, $P_N$, $P_{n'}(2^2-1)$, and $P_{N'}(2^3-1)$,
      storing and selecting the products in a predetermined order,
      shifting each of the selected products by one of 0, 1, 2 and 3 places to produce a multiplication of 1, 2, 4 and 8, and
      accumulating the products and dividing each of the accumulations by 8 to provide transformed data terms;
   (d) selecting data terms in accordance with predetermined requirements and quantizing the selected terms; and
   (e) transmitting the quantized selected terms with a relatively narrow bandwidth.

* * * * *